(No Model.) 6 Sheets—Sheet 1.

W. H. DOANE.
DUPLEX PLANING AND MATCHING MACHINE.

No. 350,190. Patented Oct. 5, 1886.

Witnesses:
Inventor (No Model.) 6 Sheets—Sheet 2.
W. H. DOANE.
DUPLEX PLANING AND MATCHING MACHINE.
No. 350,190. Patented Oct. 5, 1886.
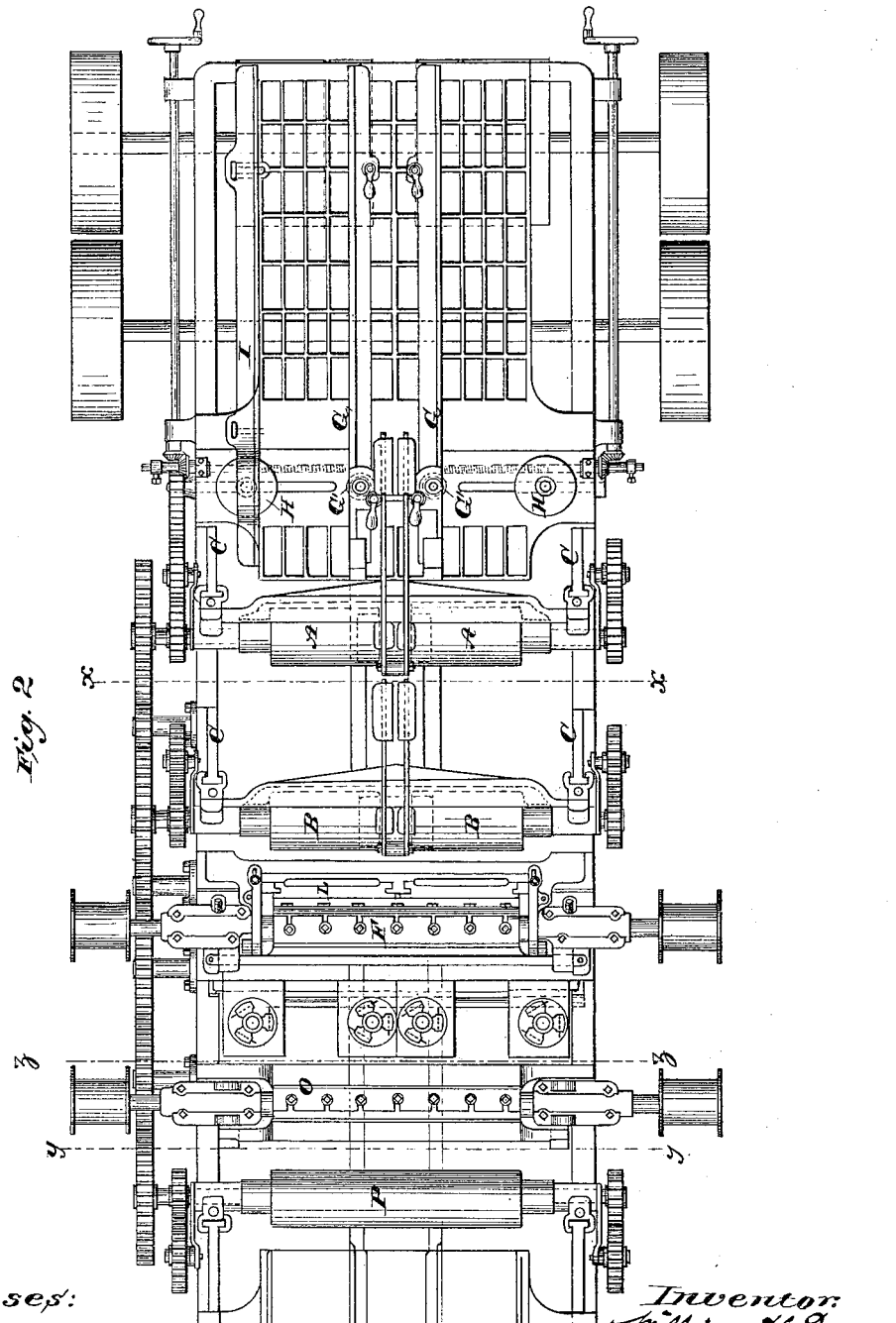

(No Model.) 6 Sheets—Sheet 3.
W. H. DOANE.
DUPLEX PLANING AND MATCHING MACHINE.
No. 350,190. Patented Oct. 5, 1886.
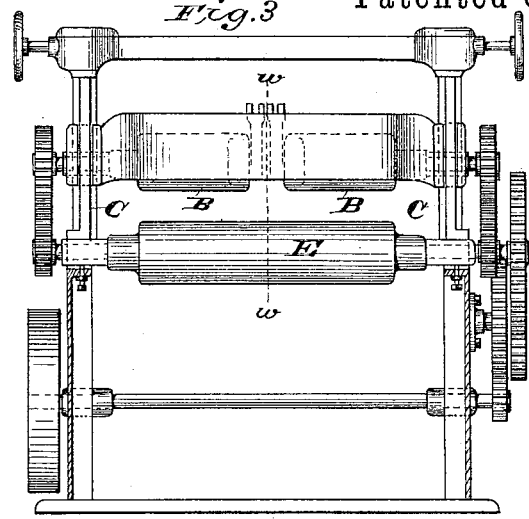
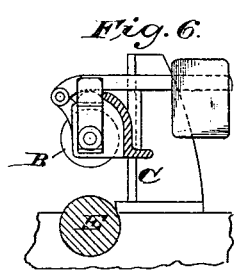
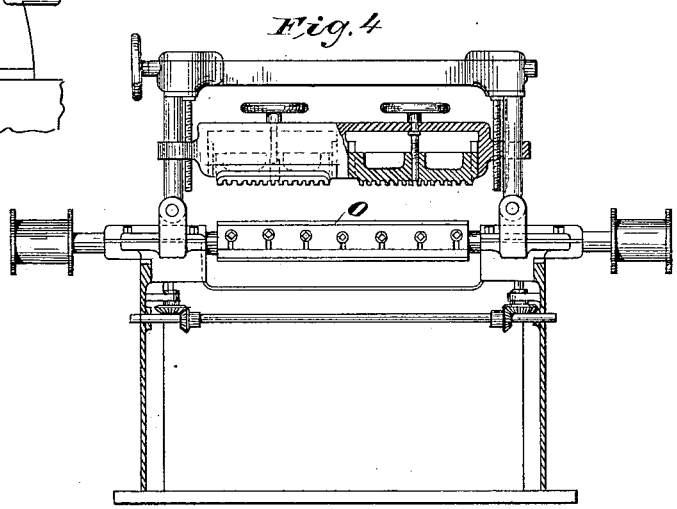
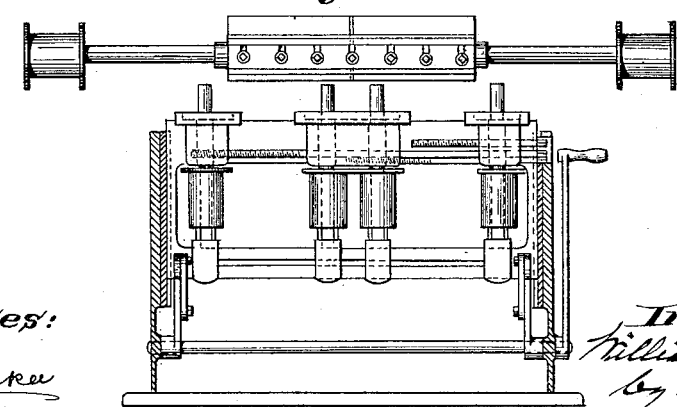

(No Model.) 6 Sheets—Sheet 4.
W. H. DOANE.
DUPLEX PLANING AND MATCHING MACHINE.
No. 350,190. Patented Oct. 5, 1886.
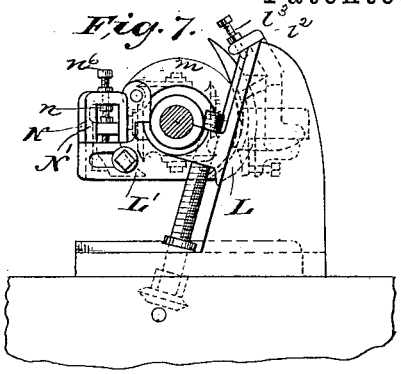
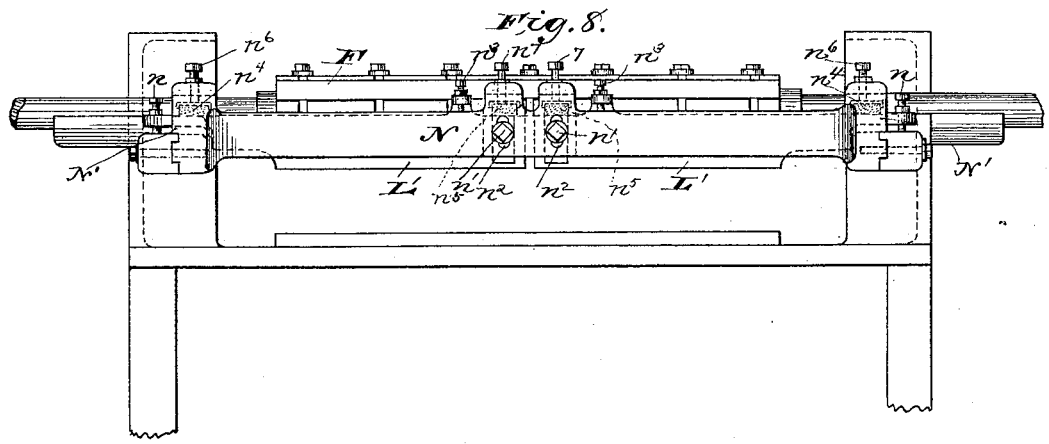
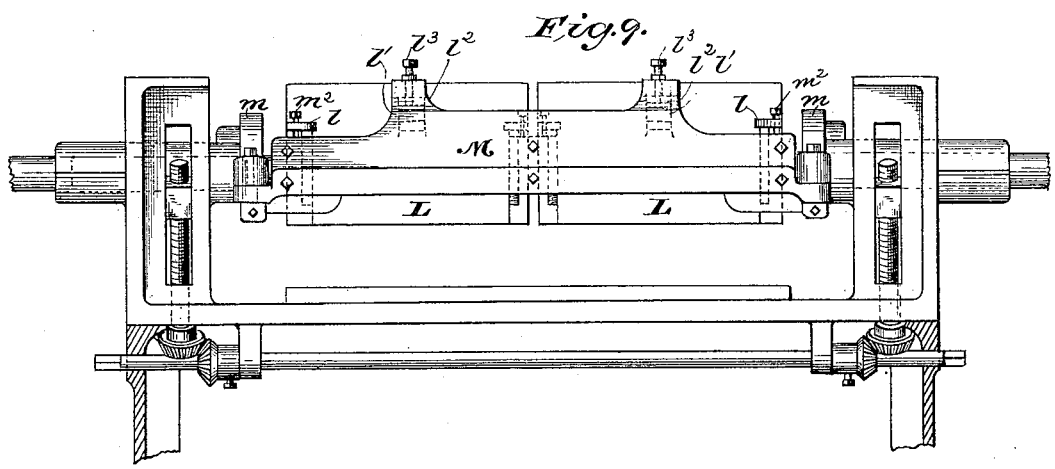

(No Model.) 6 Sheets—Sheet 5.
W. H. DOANE.
DUPLEX PLANING AND MATCHING MACHINE.
No. 350,190. Patented Oct. 5, 1886.
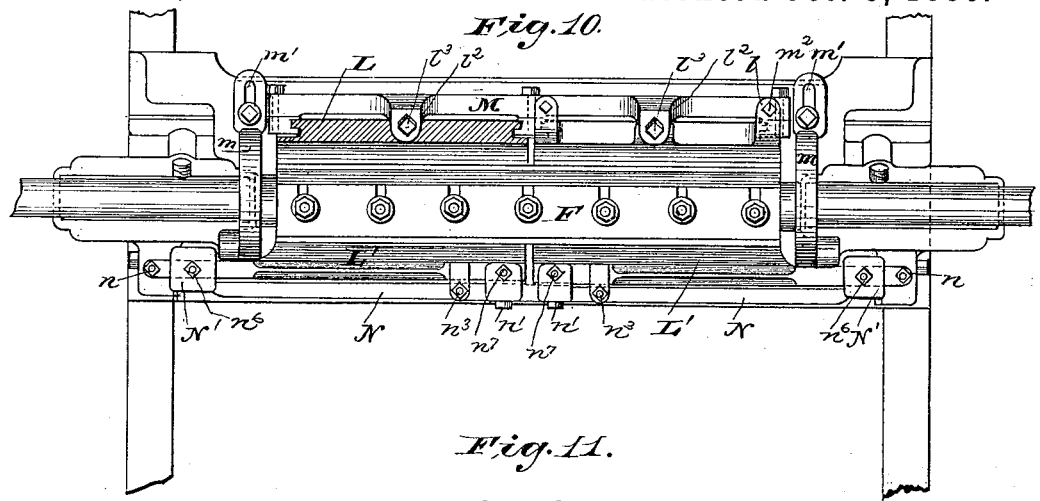
Fig. 10.
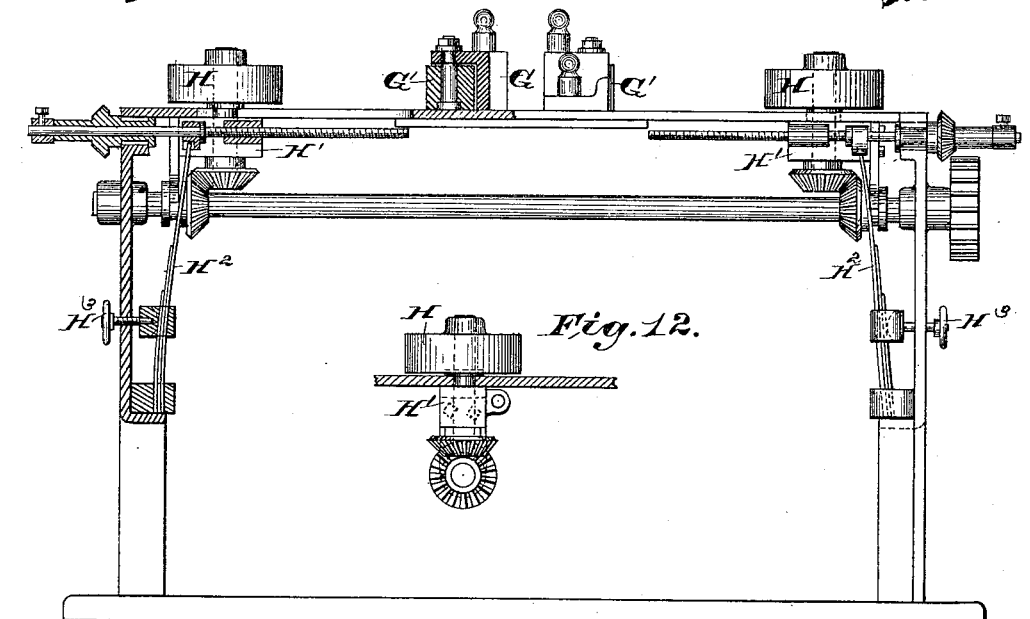
Fig. 11.
Fig. 12.
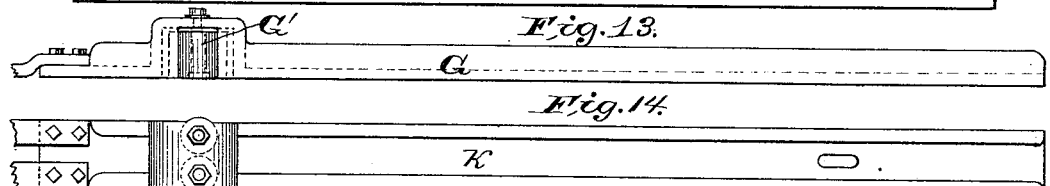
Fig. 13.
Fig. 14.
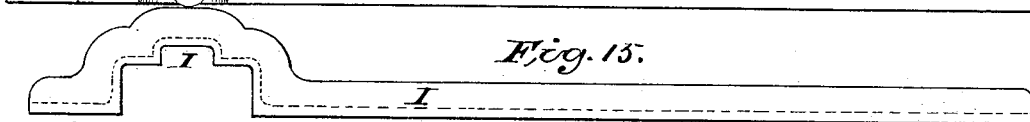
Fig. 15.
Witnesses:
E. T. Walker
Wm. E. Dyre.
Inventor:
William H. Doane
by his attorney (No Model.) 6 Sheets—Sheet 6.

W. H. DOANE.
DUPLEX PLANING AND MATCHING MACHINE.

No. 350,190. Patented Oct. 5, 1886.

Witnesses:

Inventor:

UNITED STATES PATENT OFFICE.

WILLIAM H. DOANE, OF CINCINNATI, OHIO.

DUPLEX PLANING AND MATCHING MACHINE.

SPECIFICATION forming part of Letters Patent No. 350,190, dated October 5, 1886.

Application filed April 15, 1886. Serial No. 198,970. (No model.)

*To all whom it may concern:*

Be it known that I, WILLIAM H. DOANE, a citizen of the United States, residing at Cincinnati, in the county of Hamilton and State of Ohio, have invented certain new and useful Improvements in Duplex Planing and Matching Machines; and I do hereby declare the following to be a full, clear, and exact description of the invention, such as will enable others skilled in the art to which it appertains to make and use the same.

My invention is in the nature of an improvement upon the class of duplex planing and matching machines, an example of which is illustrated in my United States Patent No. 335,994; one object being to enable such a machine to either plane and match two narrow boards simultaneously, or to simply plane two narrow boards simultaneously, or to simply plane one wide board. This object is accomplished by organizing such a duplex planing and matching machine with matcher-works that can be lowered or dropped below the platen of the machine, and with a removable duplex center fence.

The invention also consists of an improved manner of mounting the front and rear presser-feet, which are associated with the upper planing-cylinder; also of certain other details of organization and construction, all of which will be clearly described, and particularly pointed out by separate claims at the close of this specification.

In order that my invention may be clearly understood, I have illustrated in the annexed drawings, and will proceed to describe, one practical form thereof.

Figure 1:
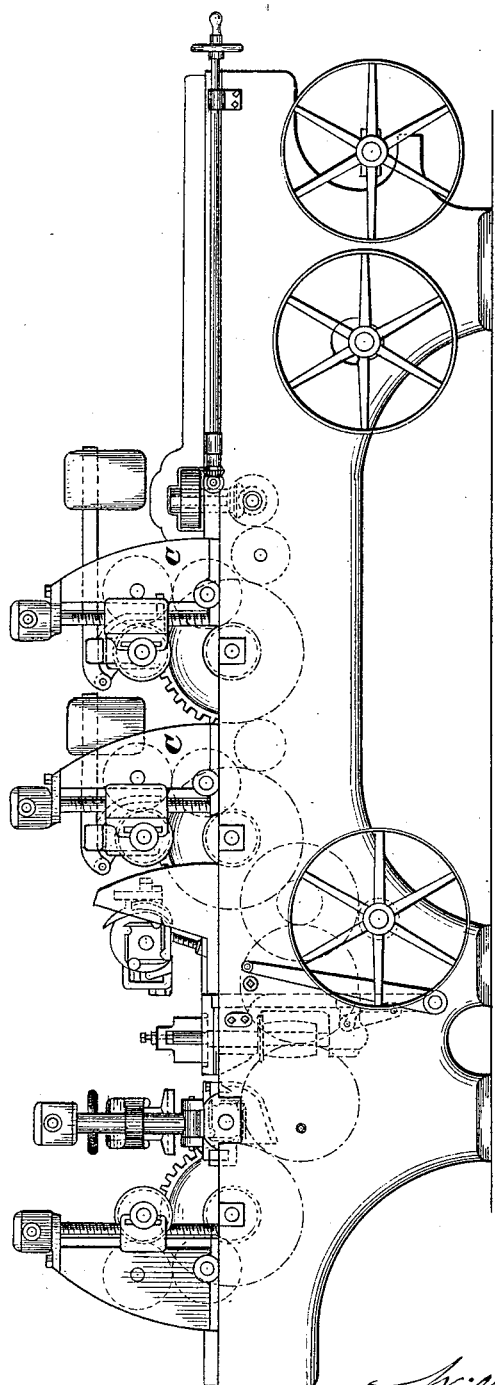
Figure 16:
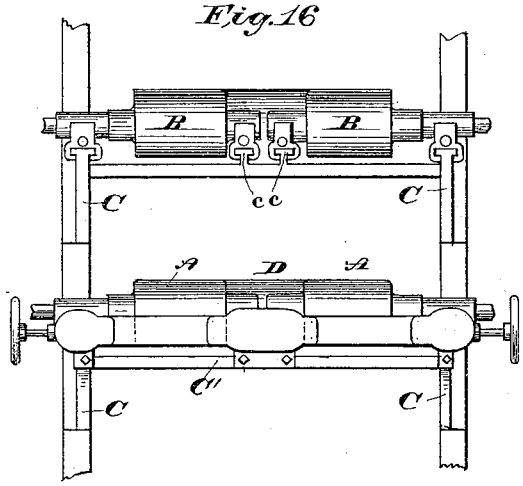
Figure 17:
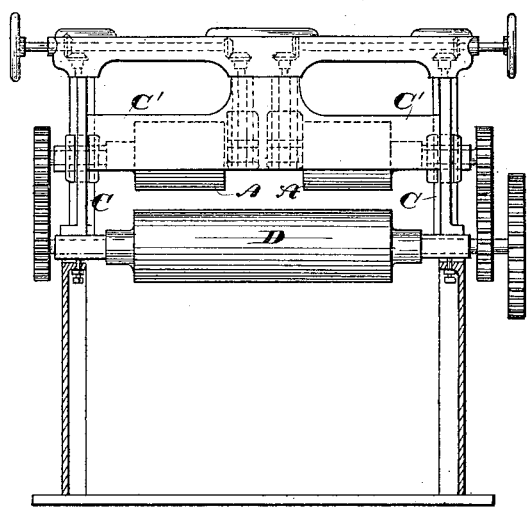

Figure 1 represents a side elevation of my improved duplex planing and matching machine, some parts being omitted for the sake of clearness of the remainder. Fig. 2 represents a plan view of the same, from which also many parts are omitted for the same reason. Fig. 3 represents a cross section taken in the plane indicated by broken line *x x* on Fig. 2. Fig. 4 represents a cross-section taken in the plane indicated by broken line *y y* on Fig. 2. Fig. 5 represents a cross-section taken in the plane indicated by broken line *z z* on Fig. 2. Fig. 6 represents a cross-section taken in the plane indicated by broken line *w w* on Fig. 3. Fig. 7 represents an end view of the upper planing-cylinder and parts associated therewith. Fig. 8 represents a rear elevation of the same parts. Fig. 9 represents a front elevation of the same parts. Fig. 10 represents a plan view of said parts. Fig. 11 represents the front end of the machine, partly in elevation and partly in section. Fig. 12 illustrates the manner of mounting the edge feed-roll. Fig. 13 is a side elevation of one member of the duplex center fence. Fig. 14 represents a plan view of a narrow duplex center fence. Fig. 15 represents a side elevation of the side fence used in surfacing wide boards. Fig. 16 represents a plan view of the preferred organization of the feeding-in rolls, the suspension and adjusting mechanism of one rank of such feeding-in rolls being omitted. Fig. 17 represents an end elevation of this organization of feeding-in rolls, showing the frame of the machine in cross-section.

The same letters of reference indicate identical parts in all the figures.

The machine, in its general construction, is similar to the machine described in my United States Patent No. 335,994, and parts not particularly described in this specification or omitted from the drawings may be constructed and organized in substantial accordance with the machine described in said patent. On each side of the machine there is an upper primary feeding-in roll, A, and an upper assistant feeding-in roll, B, which may be mounted as shown in Fig. 3, which corresponds with the mounting of said feeding-in rolls shown in Fig. 3 of my aforesaid patent. I prefer, however, the improved mode of mounting these upper feeding-in rolls, as shown in Figs. 16 and 17, where the side standards, C C, of each roll-stand are connected by a rigid cross-bar, C', provided at the center with a pair of vertical guides, *c c*, similar to the vertical guides on the roll-standards C C, and where the respective journal-boxes of each roll are mounted independently, so that the rolls may be adjusted independently. This construction enables me to suspend the upper feeding-in rolls, so as to leave a free passage beneath them across the whole platen of the machine, so that the said feeding-in rolls may operate either on two narrow boards, or upon a single wide board, as may be required in the use of the machine.

The partly-illustrated adjusting mechanism for the upper feeding-in rolls is substantially like that described and claimed in my application for a United States Patent filed April 15, 1886, and numbered by the Patent Office 198,971. Each of the two ranks of upper feeding-in rolls is associated with a single long lower feeding-in roll, (marked, respectively, D and E.) The upper feeding-in rolls may be weighted, as indicated in Figs. 1, 2, and 6. The surfacing is effected by a single long upper planing-cylinder, F. The tonguing and grooving is effected by matcher-works beyond the upper planing-cylinder, F, which are shown as constructed and applied substantially as described in United States Letters Patent No. 219,651. The essential feature of these matcher-works is that they can be lowered or dropped below the platen of the machine, entirely out of the way of the board or boards coming from the upper planing cylinder, F. I have embodied these particular drop matcher-works in this machine, because they have proved to be very effective and satisfactory in practical use; but any other known form of drop matcher-works may be substituted for the particular form shown.

The machine requires a duplex center fence to enable it to properly tongue and groove two boards simultaneously. By "duplex center fence" I mean a device adapted to guide each board independently to the center matcher-head or matcher-heads. For this purpose I prefer to use two separate rails, G G, arranged back to back and so bolted to the machine that they may be adjusted independently in lateral directions to bring them in proper alignment with the respective matcher-heads. Each side of the machine is organized with an edge-feed roll, H, substantially such as described in my aforesaid United States Patent No. 335,994; but instead of placing the journal-box of said roll in a slot in the platen of the machine, as shown in said patent, I now arrange the journal-box H' beneath the platen, and use merely a narrow cross-slot in the platen for the passage of the roll-journal, all as clearly shown in Figs. 2, 11, and 12; and in place of the rubber spring shown in said patent I associate a plate-spring, H², with the adjusting-screw of the said edge-feed roll, the spring being mounted as shown in Fig. 11, combined with a set-screw, H³, for regulating its tension. The connection between the spring and the adjusting-screw is secured by providing the screw-shaft with a fixed collar and placing on said shaft a loose collar adjacent thereto. This loose collar is provided with a construction which is engaged by the end of the spring.

At points directly opposite the edge-feed rolls H H each rail G of the duplex center fence is provided with an anti-friction roller G', to reduce the friction of the boards against the rails of the said duplex center fence. One side of the machine is also provided with a side fence, I, laterally adjustable on the platen of the machine and constructed with an arch, I', through which the edge-feed roll may pass.

When the machine is to be used for planing and matching two boards, the matcher-works are elevated to the position shown in Figs. 1 and 5, the rails G G of the duplex center fence are properly adjusted with reference to the center matcher-heads, the side fence, I, is pushed back as far as it can be toward the edge of the machine, and the edge-feed rolls are adjusted with reference to the width of the boards to be fed to the machine. When the machine is to be used merely for surfacing two board simultaneously, I prefer to remove the duplex center fence composed of rails G G, and to substitute therefor the duplex center fence, K, (shown in Fig. 14,) which is somewhat narrower, the matcher-works are dropped below the platen and the edge-feed rolls drawn back as far as they can be toward the respective edges of the machine. When the machine is to be used for merely surfacing one wide board, the duplex center fence is removed, the matcher-works are dropped below the platen of the machine, the edge-feed rolls drawn back as far as they can be toward the respective edges of the machine and the side fence, I, properly adjusted with reference to the width of the board to be dressed, so adjusted, may be, that the edge-feed roll under the arch of this side fence can just operate on the edge of the board. The long upper planing-cylinder has associated with it two front presser-feet, L L, and two rear presser-feet, L' L'. The front presser-feet, L L, are mounted on curved guides on the back of the yoke M, which is pivoted by its arms $m\ m$ on the bearings of the planing-cylinder shaft. The yoke M is bolted to its arms $m$, which are provided with slots $m'$, so that the yoke can be adjusted on them toward or from the planing-cylinder. Each presser-foot L is supported on the yoke at any desired height by adjustable set-screws $m^2$, screwed through lugs $l$ on the presser-foot and resting on the top of the yoke. The independent upward motion of the presser-feet L on the yoke is limited by set-screws $l^3\ l^3$, screwed through overhanging lugs on the yoke above lugs $l^2\ l^2$ on the respective presser-feet. I make no claim in this connection to anything covered by Patent No. 347,254. The rear presser-feet, L' L', are mounted on a rigid cross-bar, N, bolted to lugs on the bearings of the planing-cylinder shaft through horizontally-elongated slots, so that said cross-bar may be receded or advanced with reference to the planing-cylinder. The outer end of each presser-foot L' passes through and is guided by a vertical stirrup-guide, N', of which there is one at each end of bar N. The protruding end of such presser-foot L' carries a set-screw, $n$, the foot of which bears upon the bearing-lug. The inner end of each presser-foot L' is guided by a bolt, $n'$, passing through a vertical slot, $n^2$—one for each presser-foot—in cross-bar N, and is also provided with a set-screw, $n^3$, screwed through a lug on the presser-foot which overhangs the cross-bar N. By means of the set-screws $n$ and $n^3$ the presser-feet L' L' may be accurately adjusted in height. These presser-feet have also a limited upward motion on bar N, which is provided for by springs or rubber cushions $n^4$ and $n^5$ and set-screws $n^6$ and $n^7$ for each presser-foot. The cushions $n^5$ are placed on the feet in the stirrup-guides of bar N, under set-screws $n^6$, while the cushions $n^5$ are placed on the feet under the overhanging lugs of bar N, through which the set-screws $n^7$ are screwed. The degree of downward pressure exerted by presser-feet L' L' can be regulated by set-screws $n^6$ and $n^7$.

The machine illustrated in the drawings is provided beyond the matcher-works with a long lower planing cylinder, O, which is associated with duplex pressure-bars, such as shown in Fig. 4, and described and claimed in my aforesaid pending application for a United States patent. Beyond this lower planing-cylinder the machine is provided with a pair of long feeding-out rolls, the upper one, P, of which is shown in Fig. 2.

It is obvious that two short planing-cylinders arranged one in advance of the other and overlapping are the equivalent of a single long planing-cylinder.

So far as the pressure attachment for the upper planing-cylinder is concerned, my invention is limited to the duplex feature of the rear presser. Heretofore a single presser-foot has always been used in rear of a planing cylinder. I find that it is a decided advantage, especially on duplex planing-machines, to use duplex presser-feet in rear as well as in advance of the planing cylinder or cylinders.

A horizontally-extending recess in the guiding-edge of the side fence is the obvious equivalent of the archway hereinbefore described.

I claim as my invention—

1. A duplex planing and matching machine constructed with a planing-cylinder or planing-cylinders extending substantially across the bed of the machine, upper feeding mechanism arranged to leave an unobstructed passage for lumber beneath the same across the machine, and duplex matcher-works arranged to be dropped below the bed plate, substantially as described.

2. In a duplex planing and matching machine, the combination, substantially as before set forth, with duplex feeding-in rolls and a single long upper planing-cylinder, of drop matcher-works and a removable duplex center fence, whereby the machine is enabled to plane and match two narrow boards simultaneously, or, on dropping the matcher-works, to plane two narrow boards simultaneously, or, on dropping the matcher-works and removing the duplex center fence, to plane one wide board.

3. In a duplex planing and matching machine, the combination, substantially as before set forth, with duplex feeding-in rolls, a single long upper planing-cylinder and a single long lower planing-cylinder, of drop matcher-works and a removable duplex center fence, whereby the machine is enabled to plane and match two narrow boards simultaneously, or, on dropping the matcher-works, to plane two narrow boards simultaneously, or, on dropping the matcher-works and removing the duplex center fence, to plane one wide board.

4. The combination, with a long upper planing-cylinder, of duplex independently-adjustable presser-bars on each side of such planing-cylinder.

5. The combination, with duplex feeding-in rolls, duplex center fence, and single long upper planing-cylinder, of duplex independently-adjustable presser-bars on each side of such planing-cylinder.

6. A rear presser, substantially as before set forth, consisting of a horizontally-adjustable bar and two independently adjustable and yielding presser-bars attached thereto, substantially as described.

7. In a planing-machine, the combination, substantially as before set forth, of a laterally-movable edge-feed roll and the side fence provided with an arch through which said edge-feed roll can pass.

8. In a duplex planing and matching machine, the combination, substantially as before set forth, with the platen, of a feed-roll stand having a cross-bar elevated throughout its length above said platen, and two independently-adjustable feed rolls, the center journal-boxes of which are mounted on guides on the said elevated cross-bar.

In testimony whereof I affix my signature in presence of two witnesses.

WILLIAM H. DOANE.

Witnesses:
A. M. NEWKIRK,
ALBERT STEPHAN.